United States Patent [19]
Lloyd

[11] 3,782,008
[45] Jan. 1, 1974

[54] SYNCHROSCOPE TRAINING DEVICE

[75] Inventor: Evan E. Lloyd, Columbia, Md.

[73] Assignee: The Singer Company, Binghamton, N.Y.

[22] Filed: May 9, 1972

[21] Appl. No.: 251,892

[52] U.S. Cl............................ 35/19 A, 35/10, 35/13
[51] Int. Cl. ............................................ G09b 23/06
[58] Field of Search ...................... 35/1, 10, 11, 13, 35/19 R, 19 A, 12 R, 12 D, 12 E, 12 T, 12 F, 12 L, 12 S, 48 R, 8 R, 22 R; 324/91; 318/601–604, 171, 227, 231; 340/172, 187

[56] References Cited
UNITED STATES PATENTS
3,621,350  11/1971  Masterman ..................... 318/231 X
2,685,674  8/1954  Rich et al. ....................... 324/91 X Primary Examiner—Robert W. Michell
Assistant Examiner—Vance Y. Hum
Attorney—Andrew L. Bain

[57] ABSTRACT

This is a system for simulating the operation of a synchroscope in an alternating current generating system which includes a power network or bus and a plurality of alternators which are to be paralleled to that bus. The system is usually a part of a large simulation system such as that which depicts the operation of a complete power plant. The simulator computer designates one of the alternators as the reference alternator which is presently supplying power to the bus. The reference frequency is designated by a number output from the computer, the value of which number represents the frequency of a variable frequency oscillator. A second output word from the computer represents the frequency of the second alternator which is to be paralleled to the first. This word is also converted to a voltage which determines the output frequency of a second variable frequency oscillator. The outputs of the two oscillators are then applied to the two coils of a standard synchroscope.

7 Claims, 1 Drawing Figure

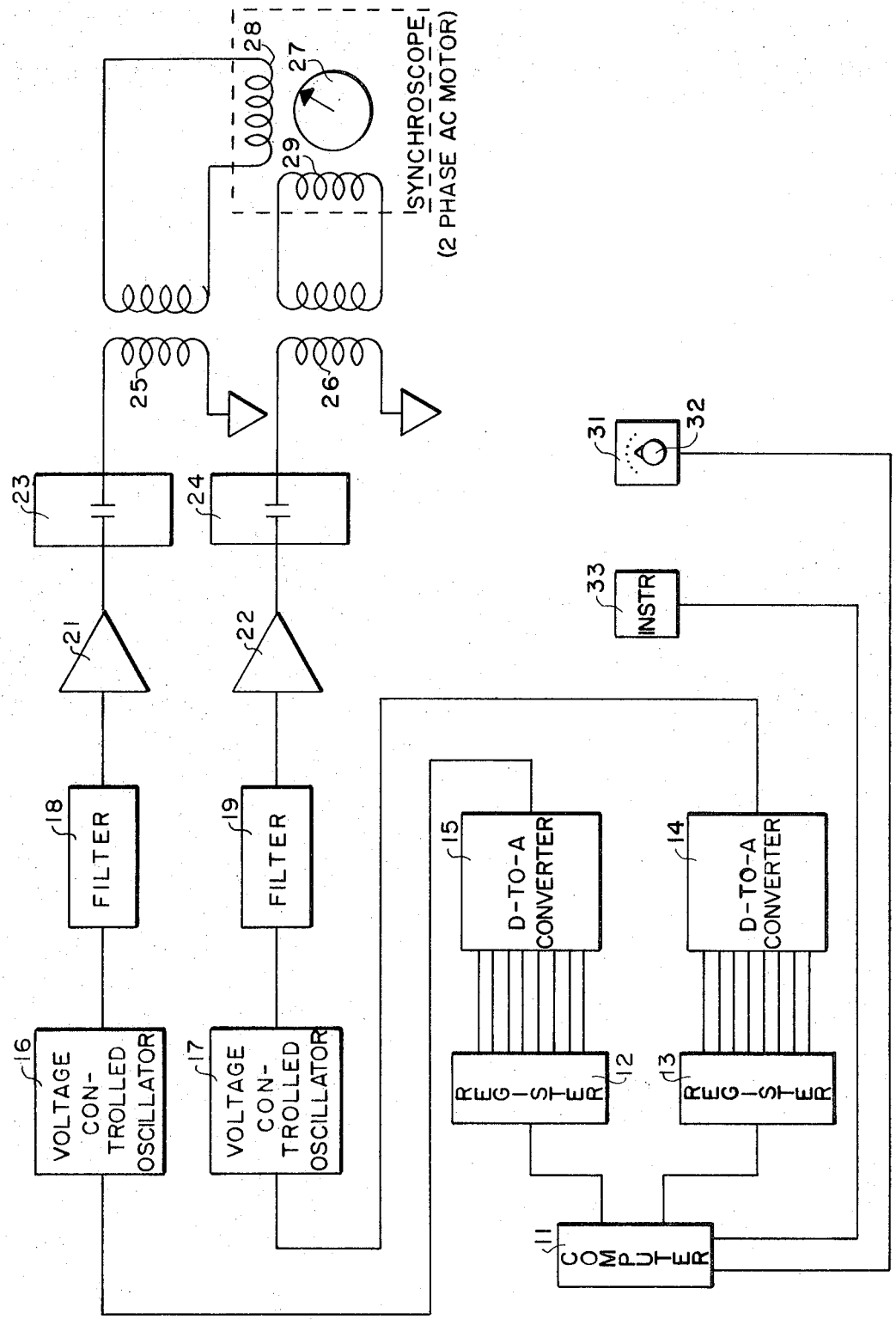

3,782,008

SYNCHROSCOPE TRAINING DEVICE

BACKGROUND OF THE INVENTION

1. Field of the Invention

This invention relates to training devices and more particularly to a system for simulating the operation of electrical equipment.

2. Description of the Prior Art

It has been standard practice in many industries, including the power plant industry, to train new personnel directly on the equipment itself. In the past, this system worked out quite well. Often, trainees worked the night shift, or the graveyard shift, when the load was light and spare generating capacity was available. Under these conditions, alternators can be started, brought up to speed, and paralleled to the power network without disrupting the operation of the system or of the power supplied to the customers. However, in recent years, the use of electrical equipment has increased so that the generating plant no longer has the excess capacity during the night that it once had. Automatic air conditioners and similar systems during the summer months and electrical heating devices—space heaters, electric blankets, electric hot water heaters—all tend to load the system as a whole, both day and night. Therefore, the ability to use idle generators for training purposes is no longer present. In addition, the newer generating plants are very complex systems often using nuclear energy reactors as their source of power. The cost of startup and shutdown of such systems is very expensive. All of this has made the use of simulators for training personnel in the operation of electrical generating equipment feasible.

SUMMARY OF THE INVENTION

This invention provides one component system which can be used in a larger simulator complex for training personnel in the techniques used for paralleling alternators. The invention comprises a variable frequency source of electrical energy for each alternator in the system. In addition, means are provided, often a computer, for supplying the appropriate control signals for controlling the frequency of these sources. The outputs from the sources are converted to the appropriate voltage levels and applied directly to a standard, two-way, dynamometer.

It is an object of this invention to provide a new and improved training system.

It is another object of this invention to provide a new and improved training device for training personnel in the use of electrical equipment.

It is a further object of this invention to provide a new and improved system for training personnel in paralleling alternators.

Other objects and advantages of this invention will become more apparent as the following description proceeds; which description is to be considered together with the following drawing.

BRIEF DESCRIPTION OF THE DRAWING

The single FIGURE of this specification is a block diagram illustrating the system of the invention.

The reference character 11 designates a computer which has one output connected to a first register 12 and a second output connected to a second register 13. The output of the register 12 is taken in parallel from each of its stages and connected to the inputs of a digital-to-analog converter 15. Similarly, the outputs of the register 13 are connected in parallel to the inputs of a second digital-to-analog converter 14. The analog signal output from the converter 15 is applied to the input of a voltage controlled oscillator 16 whose output is applied through a filter 18 to the input of an amplifier 21. The output of the amplifier 21 is coupled through a coupling capacitor 23 to one side of the primary of a step-up transformer 25. The other side of the primary of the transformer 25 is grounded. The secondary of the transformer 25 is connected to one coil 28 of a synchroscope 27. In a similar manner, the output of the converter 14 is connected to the control input of a voltage controlled oscillator 17 whose output is applied through a filter 19 to the input of an amplifier 22. The output of the amplifier 22 is applied through a coupling capacitor 24 to one side of the primary of a step-up transformer 26, whose other side is grounded. The secondary of the transformer 26 is connected to the other coil 29 of the synchroscope 27. An instructor's station 33 is provided for an instructor or operator to supply initial conditions and changes to the computer 11. A trainee station 31 having a rotatable knob 32 is provided so that a trainee can indicate to the computer 11 the manner in which the output of the computer 11 is to vary. Standard computer input terminals may be used.

The system shown in the FIGURE will simulate only a single pair of alternators, but additional channels identical to those shown can be supplied for each additional alternator to be added. If a single synchroscope is to be used and a multiplicity of channels, then switching means must be provided to connect the proper channels to the coils of the synchroscope. The computer 11 is really symbolic because any source of digital information can be used. A computer is used in the system described so that either of the two alternators used in the example of this specification can serve as a reference alternator at any time. If one of the alternators is always to be the reference alternator, then a much simpler system can be constructed. This will be described below. The instructor can select which of the two alternators being simulated is already connected to the power network. That selects the reference alternator. The output from the computer is then a word whose value represents the nominal frequency of the network. In the United States, this would be 60 cycles per second; in other countries it could be a different frequency. This number is stored in the register 12 and is converted into a prescribed voltage by the digital-to-analog converter 15. That standard voltage, when applied to the input of the oscillator 16, causes that oscillator to oscillate at the desired frequency. The oscillator 16 can be a free-running multivibrator, for example. The output from such an oscillator is a rectangular wave which may be unipolar. To convert the rectangular into a bipolar sine wave, it is applied to the filter 18. The output from the filter 18 is a sine wave having the same frequency as the fundamental frequency of the oscillator 16. This signal is amplified in the amplifier 21 to provide enough power to drive the synchroscope 27. In modern systems, the apparatus described so far is usually formed of solid state components. Normally, the voltage driving such components is in the neighborhood of 12 volts. The output of the amplifier 21 can be considered to be in the neighborhood of 12 volts. Since standard synchroscopes are built to be operated from 120-volt mains, a step-up transformer 25 having a step-up ratio of any suitable amount such as 10 to 1 is used. The output of the transformer 25 is a sine wave in the nominal reference frequency, say 60 cycles per second, and at 120 volts.

The second channel is used to represent the alternator which is to be connected to the power network. The instructor or other operator selects the starting frequency of the alternator which gradually comes up to speed once its prime mover is started. The computer 11 generates a number whose value represents this frequency in response to the signal from the instructor's console 23. The manner in which information of this nature can be inserted into a computer need not be described in detail herein. One such means for inserting information of this nature into the computer 11 is a set of switches, such as rotary switches, mounted on the instructor's console 23. The frequency can be dialed in by the use of such switches. Computer 11 supplies this second word to the register 13 where it is stored. Since the output of the register 13 is applied to the input of the digital-to-analog converter 14, that word is converted into a prescribed voltage which is applied to the voltage control oscillator 17. The oscillator 17 can also be a standard free-running multivibrator whose output is a square wave with a frequency determined by the voltage applied to the oscillator 17 from the converter 14. This square wave is converted into a sine wave of the same frequency by a filter 19 and is amplified by the amplifier 22. The output of the amplifier 22 is applied through the coupling capacitor 24 to the primary winding of the step-up transformer 26. A transformer having a suitable step-up ratio of 10 to 1 is used for a second channel for the same reason that the transformer 25 was used in the first channel. Thus, a second signal having a frequency determined by the information supplied to the computer 11 from the instructor station 33 is applied to the second coil 29 in the synchroscope 27.

At this point, the needle of the synchroscope 27 is rotating at a speed which is equal to the difference in the frequencies of the signals applied to the two coils 28 and 29. The trainee rotates the knob 32 on the control box 31 to supply signals to the computer 11. Rotation of the knob 32 in one direction causes the computer to generate output numbers having higher values, and rotation of the knob 32 in the other direction causes the computer 11 to generate output numbers having lower values. As the trainee changes the position of the knob 32, the computer generates the appropriate number which is converted into a square wave by the voltage control oscillator 17 and eventually is applied as a sine wave to the winding 29 of the synchroscope 27. The control knob 32 represents the speed control of the prime mover for the number of alternators. As the knob is rotated, it represents an increasing speed of the prime mover or a decrease in the speed of the primer mover. If the direction of rotation of the knob 32 was correctly selected, the frequency of the sine wave applied to the coil 29 moves closer to the frequency of the sine wave applied to the coil 28 and the rotation of the pointer slows down. In this manner, the trainee gradually reduces the speed of rotation of the pointer 27 until he finally causes the needle to stop rotating. This indicates that the signals applied to the two coils 28 and 29 are of the same frequency. By careful manipulation of the controls, the pointer is made to stop while it is pointing upward. This further indicates that the two alternating current signals are in phase at that point, and by appropriate switching the second alternator is paralleled to the power network.

In a system where one alternator is always used as the reference alternator, the computer 11, the registers 12 and 13, and the digital-to-analog converters 14 and 15 may be eliminated. In such a system, assuming that the oscillator 16 is the reference oscillator, the fixed input potential can be applied to that oscillator. This maintains the frequency output of the oscillator 16 constant and represents the frequency of the power network. The input to the oscillator 17 can be controlled by the output of a control 31 which can comprise a simple potential source and rheostat. In a system of that type, the instructor merely sets the knob 32 at a point other than the proper one to cause the pointer in the synchroscope 27 to rotate, and the student then varies the setting until the pointer stops rotating. The overall operation of the remaining elements is the same as described above.

The above specification has described a new and improved system for training personnel in the operation of complex and expensive electrical generating equipment. It is realized that the above description may indicate to others skilled in the art additional ways in which the principles of this invention may be used without departing from its spirit. It is, therefore, intended that this invention be limited only by the scope of the appended claims.

What is claimed is:

1. Apparatus for simulating equipment used for paralleling alternators, said apparatus comprising a first source of alternating signals for representing a first alternator, a second source of alternating signals for representing a second alternator, a synchroscope having separate inputs for first and second alternators, means for connecting the output from said first source to the input of said synchroscope for said first alternator, means for connecting the output from said second source to the input of said synchroscope for said second alternator, means for establishing a datum frequency of the signals generated by said first source, and means for varying the frequency of the signals generated by said second source until said synchroscope indicates that the signals generated by said first and second sources are of the same frequency, said means for generating a changeable voltage comprising a digital number source, and means connected to said number source for converting the number from said number source into a voltage whose amplitude is proportional to the size of said number.

2. The apparatus defined in claim 1 wherein said second source comprises a voltage controlled oscillator.

3. The apparatus defined in claim 2 wherein said means for varying the frequency of the signals generated by said second source includes a controlled means for generating a selectably changeable voltage, and means for applying the voltage from said generating means to said second source.

4. The apparatus defined in claim 1 wherein said first and second sources each comprise a voltage controlled oscillator.

5. The apparatus defined in claim 4 wherein said means for establishing a datum for said first source comprises a first controlled means for generating a first selectably changeable voltage, wherein said means for varying the frequency of the signals generated by said second source comprises a second controlled means for generating a second selectably changeable voltage, and further including first means for applying said first changeable voltage to said first source and second means for applying said second changeable voltage to said second source.

6. The apparatus defined in claim 5 wherein each of said means for generating said selectably changeable voltage comprises a separate digital number source, and means connected to said number source for converting the number from said number source into a voltage whose amplitude is proportional to the size of said number.

7. The apparatus defined in claim 6 wherein said digital number sources comprise a digital computer.

* * * * *